United States Patent
Saeki et al.

[11] Patent Number: 5,755,551
[45] Date of Patent: May 26, 1998

[54] OBJECT DISCHARGE MECHANISM

[75] Inventors: Yutaka Saeki, Kakogawa; Hiroki Sawada; Ichiro Iwasaka, both of Kako-gun; Kenichi Yamashita, Kobe, all of Japan

[73] Assignee: Okura Yusoki Kabushiki Kaisha, Hyogo, Japan

[21] Appl. No.: 699,987

[22] Filed: Aug. 20, 1996

[51] Int. Cl.$^6$ ............................. B65G 56/09
[52] U.S. Cl. .................. 414/797.6; 414/797.9; 221/251
[58] Field of Search ................... 221/251, 253, 221/258; 414/797.5, 797.6, 797.9

[56] References Cited

U.S. PATENT DOCUMENTS

| | | | |
|---|---|---|---|
| 3,981,494 | 9/1976 | Prestegaard | 414/797.6 |
| 4,331,260 | 5/1982 | Euteteuer et al. | 221/251 |
| 4,966,521 | 10/1990 | Frye et al. | 414/797.9 |
| 5,026,250 | 6/1991 | Hofer | 414/797.6 |
| 5,476,191 | 12/1995 | Dunford et al. | 221/253 |

*Primary Examiner*—Karen B. Merritt
*Assistant Examiner*—Gregory A. Morse
*Attorney, Agent, or Firm*—Morrison Law Firm

[57] ABSTRACT

An object discharge mechanism for discharging a bottom-most object from a stack of objects includes a bottom platform on which the bottommost object of the stack of objects rests. The platform has a longitudinal slot running along the object discharge direction. The upper portion of a belt, stretched between two vertically mounted pulleys, runs through the longitudinal slot parallel to the upper surface of the bottom platform. Discharge projections are mounted periodically on an outer surface of the belt. The discharge projections push objects across the bottom platform in the object discharge direction when the belt is rotated. The object discharge mechanism also includes a lifting member for lifting all objects above the bottommost object in the stack of objects. The lifting member reduces the frictional force created by the weight of the stack of objects on the bottommost object during discharge of the bottommost object.

24 Claims, 8 Drawing Sheets

5,755,551

OBJECT DISCHARGE MECHANISM

BACKGROUND OF THE INVENTION

The present invention relates to an object discharge mechanism for discharging a bottommost object from a stack of objects.

Conventional object loading systems typically have a plurality of object storage sections. Each object storage section houses a stack of objects. A load receiving platform at the bottom of each object storage section supports the underside of the bottommost object of the stack of objects. A discharge device pushes the bottommost object across the load receiving platform, through a discharge port. The discharge port, located at either end of the lower part of the respective object storage section, allows only the bottommost object of the stack of objects to be discharged from the load receiving platform.

Conventional discharge mechanisms are typically of a reciprocating motion type. An example of such a mechanism includes a discharging piece which projects above and retracts below the load receiving platforms. The standard position of the discharging piece is at the end of the load receiving platform opposite the discharge port. The discharging piece projects above the load receiving platforms and pushes the bottommost object towards the discharge port to discharge an object. During the return phase, the discharging piece retracts below the load receiving platform and is transported back to the standard position.

In the above conventional configuration, the bottommost object is exposed to the weight of the entire stack of objects. When the stack includes a large amount of objects, the weight of the stack generates a large amount of friction between the bottommost object and the load receiving platform and also between the bottommost objects and the object immediately on top of it when an attempt is made to discharge the bottommost object.

The large amount of friction increases the resistance to discharge of the bottommost objects, making the discharge process difficult and unstable. Furthermore, because of the considerable force necessarily applied to the bottommost object in order to discharge the bottommost object against the large frictional force, the discharging piece often damages the bottommost object during the discharge process. Other damage such as scrapes on the surface of an object, peeling of printing on the surface of an object, and tearing of the wrapping of an object also occur when the bottommost object is discharged against the large frictional force.

OBJECTS AND SUMMARY OF THE INVENTION

It is an object of the present invention to provide an object discharge device which overcomes the problems of the prior art.

It is an object of the present invention to provide an object discharge device which ensures reliable discharging of the bottommost object from among the objects contained in an object storage section.

It is also an object of the present invention to provide an object discharge device which protects the object from damage when the object is discharged.

Briefly stated, an object discharge mechanism for discharging a bottommost object from a stack of objects includes a bottom platform on which the bottommost object of the stack of objects rests. The platform has a longitudinal slot running along the object discharge direction. The upper portion of a belt, stretched between two vertically mounted pulleys, runs through the longitudinal slot parallel to the upper surface of the bottom platform. Discharge projections are mounted periodically on an outer surface of the belt. The discharge projections push objects across the bottom platform in the object discharge direction when the belt is rotated. The object discharge mechanism also includes a lifting member for lifting all objects above the bottommost object in the stack of objects. The lifting member reduces the frictional force created by the weight of the stack of objects on the bottommost object during discharge of the bottommost object.

According to an embodiment of the present invention, an object discharge device capable of discharging a bottommost object from a stack of objects includes a bottom platform on which the bottommost object of the stack of objects rests, a discharge port at an end of the bottom platform, means for pushing the bottommost object across the bottom platform through the discharge port from a first position at a bottom of the stack to a second position at least partially outside the object discharge device, an object lifter being movably mounted at a lower rear portion of the object storage and discharge device, above the bottom platform, the object lifter movable between a retracted position, whereat the object lifter does not contact any of the objects, and an advanced position whereat the object lifter supports a next bottommost object, and means for moving the object lifter between the retracted position and the advanced position.

According to another embodiment of the present invention, an object loading device capable of storing a plurality of stacks of objects and discharging a bottommost object of each of the plurality of stacks of objects onto an object conveyor includes a plurality of object discharge devices, each one of the plurality of object discharge devices further including a bottom platform on which the bottommost object of the each of the plurality of stacks of objects rests, the bottom platform having a longitudinal slot, a discharge port at an end of the bottom platform, means for pushing the one of the bottommost objects along the bottom platform through the discharge port from a first position at a bottom of the one of the stacks to a second position at least partially outside the one of the object storage and discharge device, an object lifter movably mounted at a lower rear portion of the storage frame above the bottom platform, the object lifter movable between a retracted position, whereat the object lifter does not contact any of the objects, and an advanced position whereat the object lifter supports a next bottommost object of the each of the plurality of stacks of objects and means for moving the object lifter between the retracted position and the advanced position.

The object loading device includes object storage sections in which a stack of objects are contained. Load receiving platforms at the bottom of each object storage section support the underside of the bottommost object of each stack. Discharge ports at the bottom of the respective object storage sections, at the forward end thereof with respect to the direction in which objects are discharged, allow only the bottommost object to pass along to the load receiving platforms. Discharge means push the bottommost object out of the respective discharge port. The present invention also includes lifting means. Each lifting means includes an actuator and a lifting member. The actuator is positioned at the bottom of each object storage section, at the rear end with respect to the direction in which objects are discharged. The lifting member moves into and out of the corresponding object storage section so that, as the lifting member is advanced, the remaining objects are lifted above the bottommost object.

According to the present invention, when discharging an object by operating the actuator of a lifting means, the lifting member advances into the corresponding object storage section and raises the objects which are positioned above the bottommost object. This action relieves the bottommost object of the weight of the remaining objects stacked thereon. In this state, the bottommost object is discharged from the discharge port by the discharge means. After the discharge, the lifting member retracts from the object storage section. The objects which have been raised then lower onto the load receiving platforms. The system thus returns to the stand-by state and is ready for the next cycle of the discharge process.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
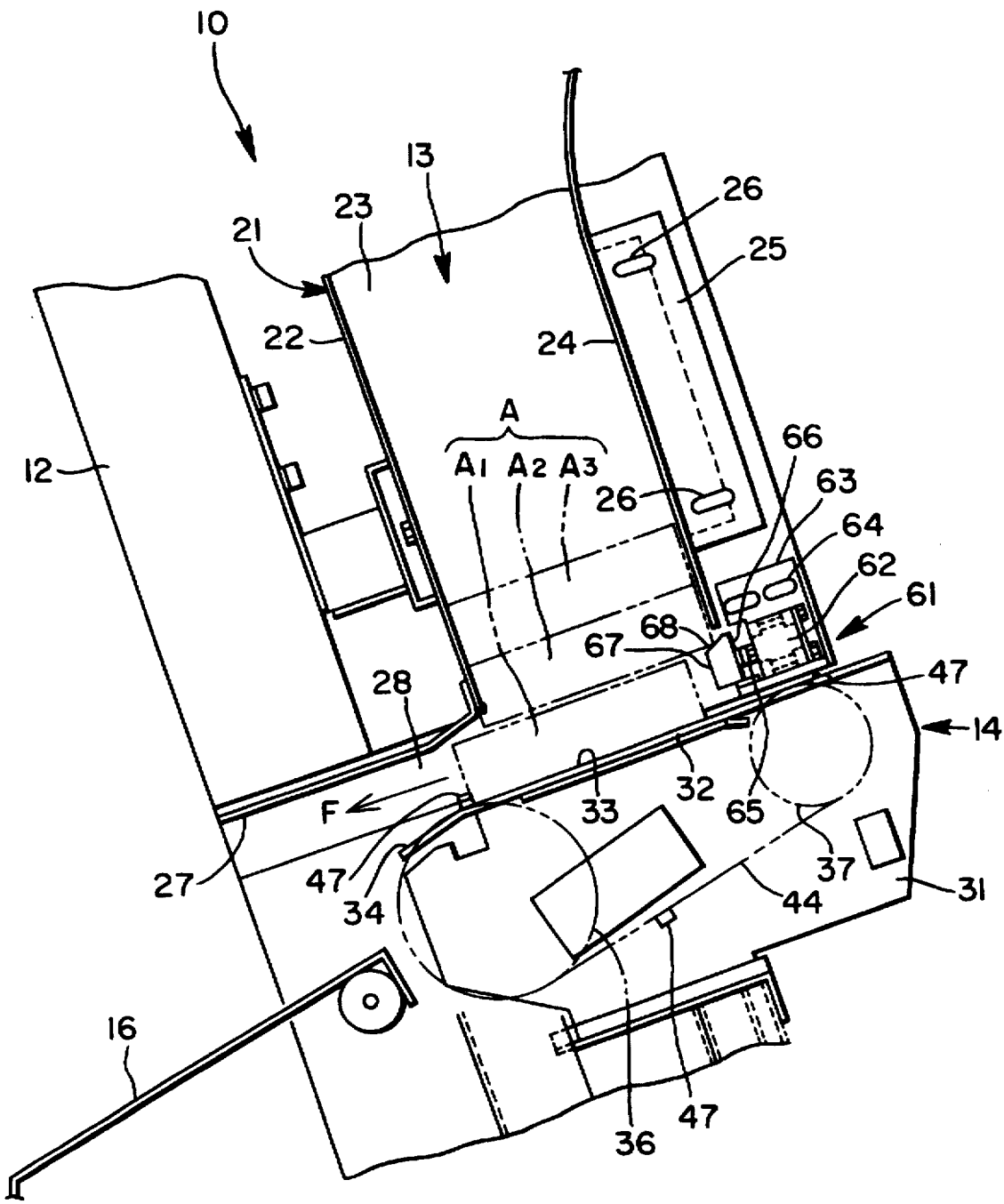
FIG. 1 is a sectional view of an object discharge device of an embodiment of the present invention viewed along the discharge path when a lifting member is at an advanced position.

Referring to FIG. 1, an object storage/discharge unit 10 includes an object storage section 13 and a discharge unit 14. Object storage section 13 has a storage frame 21 which is attached to a main frame 12. Storage frame 21 is mounted in an inclined position on main frame 12. Storage frame 21 contains a plurality of objects A, stacked one upon another. Storage frame 21 has an essentially L-shaped section comprising a front panel 22 and a side panel 23. Front panel 22 supports the forward end of objects A with respect to direction F in which the objects are going to be discharged (hereinafter simply referred to as the forward end). Side panel 23 forms by bending a side of front panel 22 at a right angle. Thus, the forward end and a side of object storage section 13 are front panel 22 and side panel 23 of storage frame 21, respectively. The other side of storage section 13 is formed by an adjacent side panel 23 of an adjacent storage frame 21.

A rear panel 24 connects to side panel 23 of storage frame 21 for supporting the rear end of objects with respect to direction F in which the objects are going to be discharged (hereinafter simply referred to as the rear end). Side panel 23 is connected to rear panel 24 by an attachment strip 25. Attachment strip 25 is an edge of a side of rear panel 24, bent at a right angle so that it is parallel to side panel 23 of storage frame 21.

Attachment strip 25 attaches to side panel 23 with fasteners such as bolts (not shown) through elongated holes 26. Elongated holes 26 are elongated in a direction parallel to discharge direction F. The position of rear panel 24 is adjusted by moving rear panel 24 along elongated holes 26. Rear panel 24 moves in a direction parallel to discharge direction F.

A bottom of object storage section 13 is bounded by a pair of load receiving platforms 32. Load receiving platform 32 supports bottommost object $A_1$. A guide member 27 is attached to front panel 22 of storage frame 21. A discharge port 28 at the forward end of load receiving platform 32 is formed by an upper surface of load receiving platforms 32 and guide member 27. Discharge port 28 permits only bottommost object $A_1$ to pass through it at one time. A chute 16, attached to the front end of discharge unit 14, receives the discharged objects A.

A lifting means 61 is mounted at the rear end of the bottom of object storage section 13, opposite discharge port 28. Lifting means 61 includes an air cylinder 62 that serves as an actuator. Air cylinder 62 connects to side panel 23 of storage frame 21 via a mounting piece 63. Mounting piece 63 includes a hole 64, elongated in discharge direction F. A bolt (or other fastener not shown) inserts through this elongated hole 64 and connects mounting piece 63 to side panel 23. A lifting member 66 connects to air cylinder 62 by a rod 65. Lifting member 66 advances or retracts by the operation of air cylinder 62.

Lifting member 66 includes a horizontal pushing surface 67 for pushing bottommost object $A_1$ in discharge direction F when lifting member 66 advances. Lifting member 66 also includes an inclined lifting surface 68 which contacts a bottom edge of a next bottommost object $A_2$, lifting next bottommost object $A_2$ upward as lifting member 66 is advanced. Lifting means 61 separates the bottommost object $A_1$ from the rest of the stack by lifting all objects A that are positioned above bottommost object $A_1$ upward when lifting member 66 advances.

Discharge unit 14 includes a vertically mounted frame board 31. The pair of load receiving platforms 32, in the shape of narrow plates, extend in discharge direction F. Load receiving platforms 32 connect to a top of vertically mounted frame board 31. The upper surface of each load receiving platform 32 is a supporting surface 33 for receiving the underside of bottommost object A. A chute surface 34, inclined downward toward chute 16, is formed at the forward end of each supporting surface 33.

A large timing pulley 36 with a large diameter and a small timing pulley 37 with a smaller diameter are mounted at one side of frame board 31. Large timing pulley 36 and small timing pulley 37 are located at the downstream side and the upstream side, respectively, with respect to discharge direction F.

A timing belt 44 is reeved about large timing pulley 36 and small timing pulley 37. Timing belt 44 includes three discharge projections 47 formed on an outer surface of the belt at regular intervals. Each discharge projection 47 is a square shape having a same width as that of timing belt 44 and a height sufficient to push bottommost object $A_1$ along parallel traveling area 46 when projected above load receiving platforms 32. Instead of a pulley and belt system, a wheel and chain system is considered to be within the scope of this invention.

Figure 2:
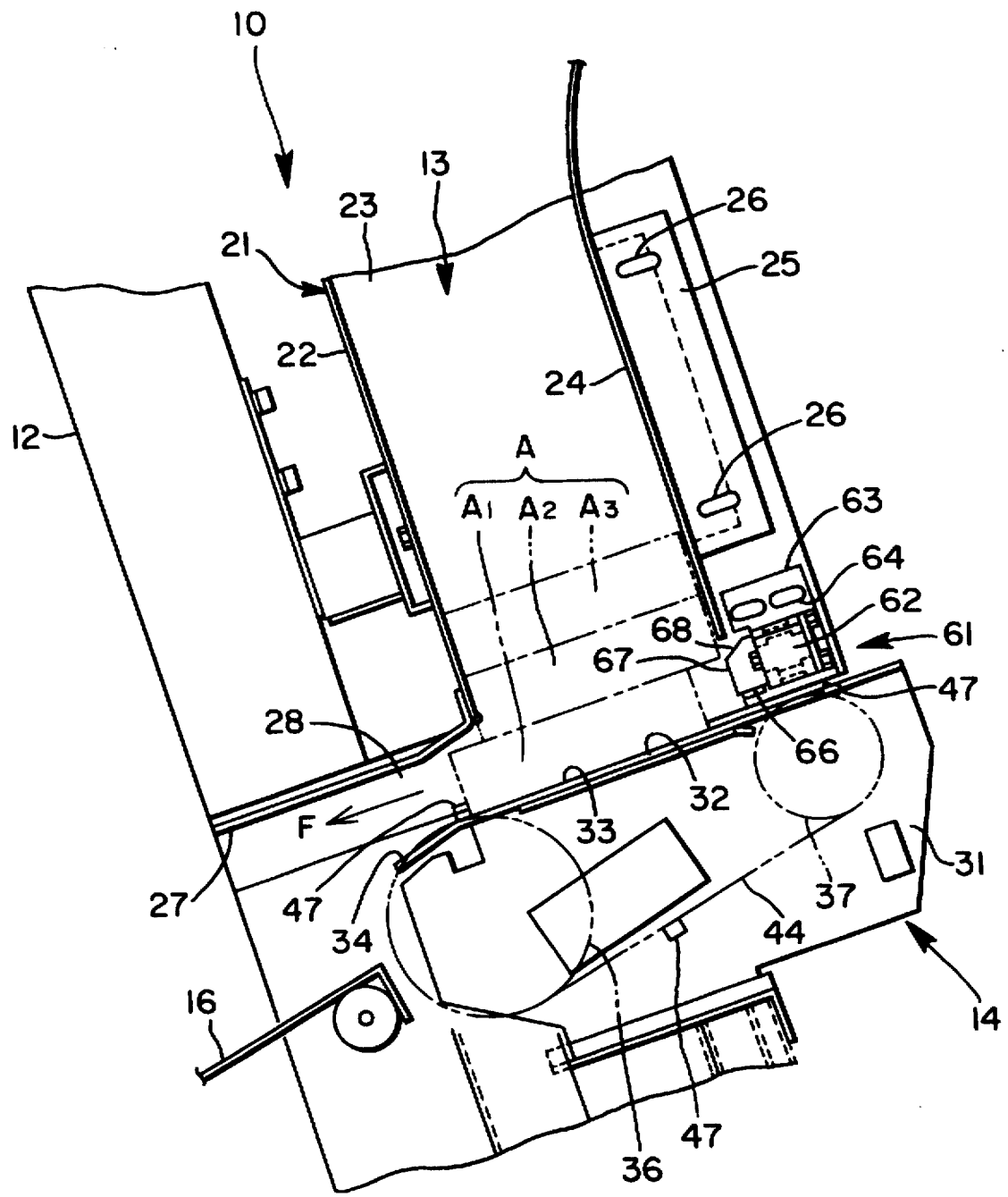
FIG. 2 is a sectional view of the object discharge device of FIG. 1 when the lifting member is at a retracted position.

Referring to FIG. 2, when air cylinder 62 pulls rod 65, lifting member 66 retracts and the stack of objects A being held by lifting member 66 drops onto load receiving platforms 32.

Figure 3:
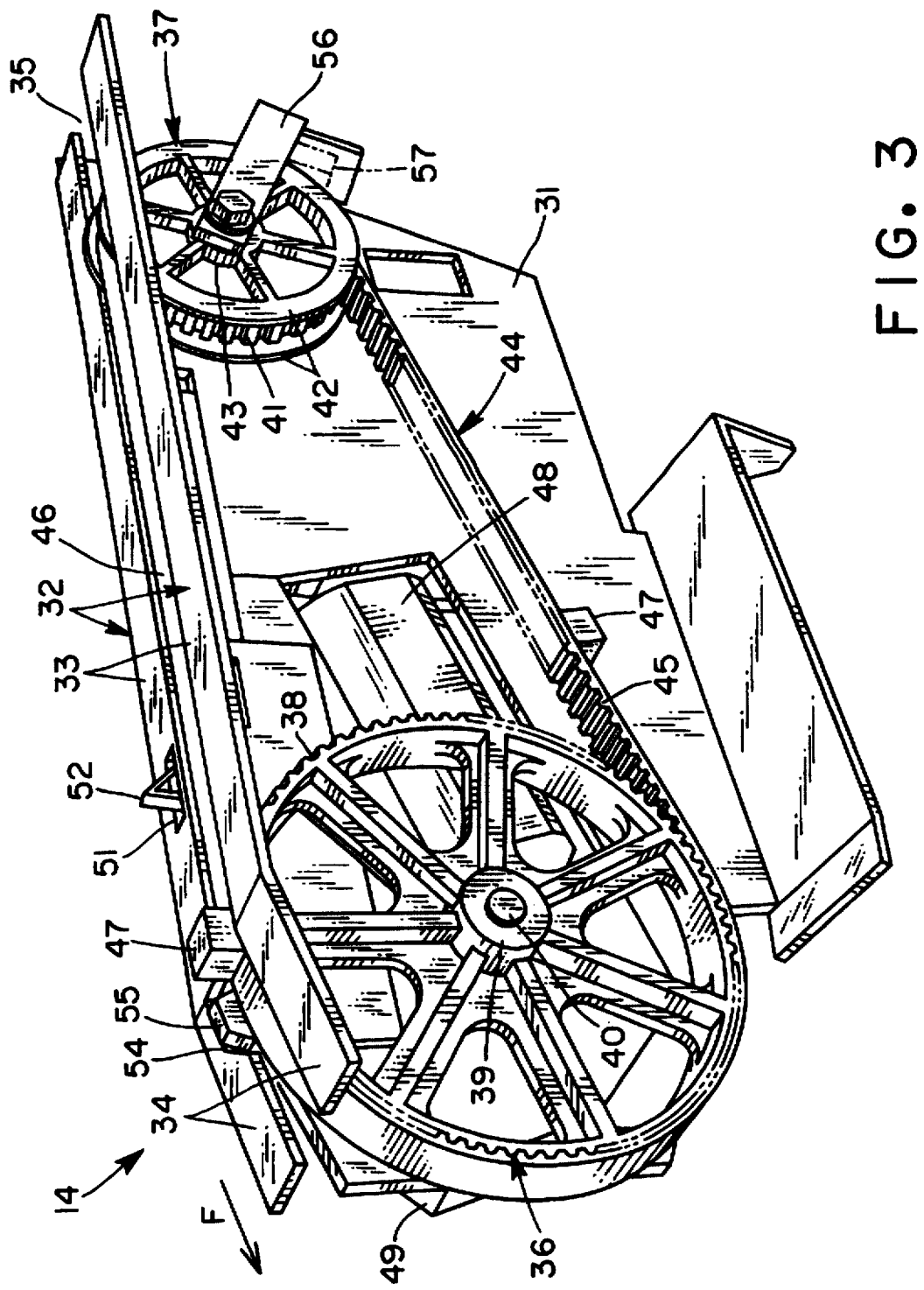
FIG. 3 is a perspective view of a discharge means of an object discharge device.

Referring to FIG. 3, a slot 35 extends in discharge direction F between load receiving platforms 32. Large timing pulley 36 has a toothed gear portion 38 formed along an outermost circumferential surface thereof. A projection 39 at a center of timing pulley 36 connects to a driving shaft 40 that projects into frame board 31. A rotating axis of driving shaft 40 is substantially horizontal. The upper part of large timing pulley 36 faces an underside of slot 35 (a plane extended from the underside of the load receiving platforms 32) in close vicinity thereto.

Small timing pulley 37 includes a toothed gear portion 41 along an outermost circumferential surface thereof. Small timing pulley 37 further includes a plurality of collar portions 42 respectively forming side walls of toothed gear portion 41. Small pulley 37 includes a projection 43 at a center thereof. Projection 43 rotatably supports small pulley 37 via a horizontal supporting shaft that projects into frame board 31. An upper end of small pulley 37 projects through slot 35.

A gear portion 45, on an inner surface of timing belt 44, engages toothed gear portions 38 and 41 of large and small timing pulleys 36 and 37, respectively. A parallel traveling area 46 is a top side of the portion of timing belt 44 that stretches between the upper parts of large and small timing pulleys 36 and 37. Parallel traveling area 46 fits in slot 35 and travels parallel to supporting surface 33.

A motor 48 and a gear mechanism 49 are mounted on the side of frame board 31 opposite large timing pulley 36. Gear mechanism 49 transmits the rotational driving force of motor 48 to driving shaft 40.

Supporting surface 33 includes a hole 51 cut out of one of load receiving platforms 32. A detection piece 52 is movably mounted in hole 51 such that it projects above and retracts into cutout hole 51. Detection piece 52 retracts into hole 51 when pushed down by object A on supporting surface 33. Detection piece 51 projects above supporting surface 33 in the absence of object A on supporting surface 33.

Chute surface 34 includes a cutout portion 54 which houses a discharge detection sensor 55. Discharge detection sensor 55 optically detects the discharge of an object A from discharge unit 14.

A discharge projection sensor 57, mounted on a bracket 56 which is attached to the supporting shaft of timing pulley 37, optically detects the passing of one of discharge projections 47 of timing belt 44.

Figure 4:
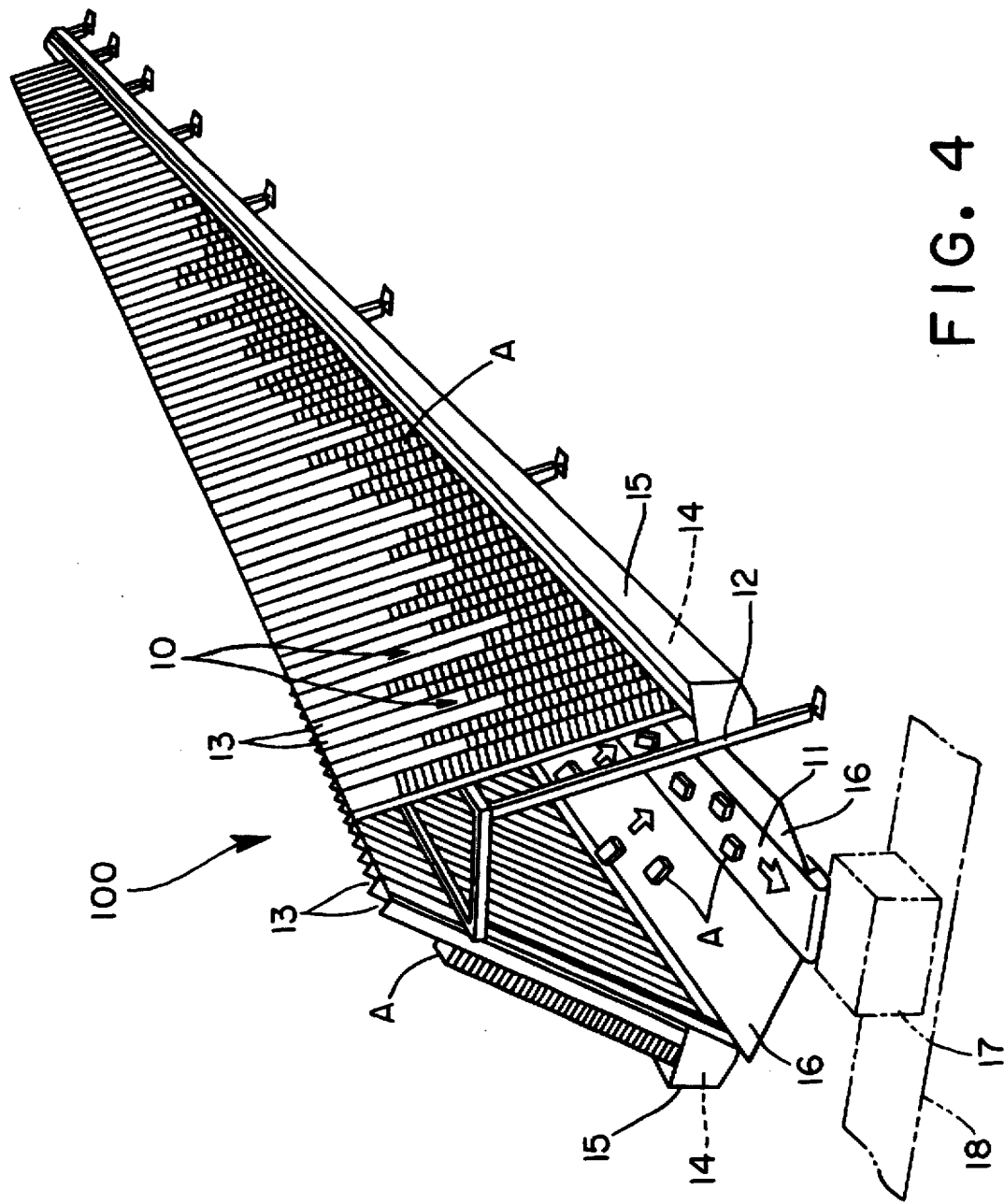
FIG. 4 is an perspective view of an object loading system.

Referring to FIG. 4 an object loading system 100 includes an object conveyor 11. An essentially A-shaped main frame 12 straddles object conveyor 11. A plurality of object storage/discharge units 10 are mounted along the sides of main frame 12. Each object storage/discharge unit 10 houses a stack containing a plurality of objects A. Objects A are sorted in groups according to their types and stacked one upon another in separate object storage/discharge units 10 along main frame 12. Discharge units 14 are covered by a number of covers 15. Discharge units 14 discharge the bottommost object A from among the objects contained in an object storage section 13 of each object storage/discharge unit 10. Chute 16 directs discharged objects A onto object conveyor 11. Chute 16 is mounted between each row of discharge units 14 and a side edge of object conveyor 11 which faces the row of discharge units 14.

A container conveyor 18, located below an end of the conveying path of belt conveyor 11, preferably extends perpendicularly to belt conveyor 11. Container conveyor 18 feeds containers 17, each of which will house objects discharged by each cycle of retrieval, to a loading position below the end of the conveying path of object conveyor 11.

Figure 5:
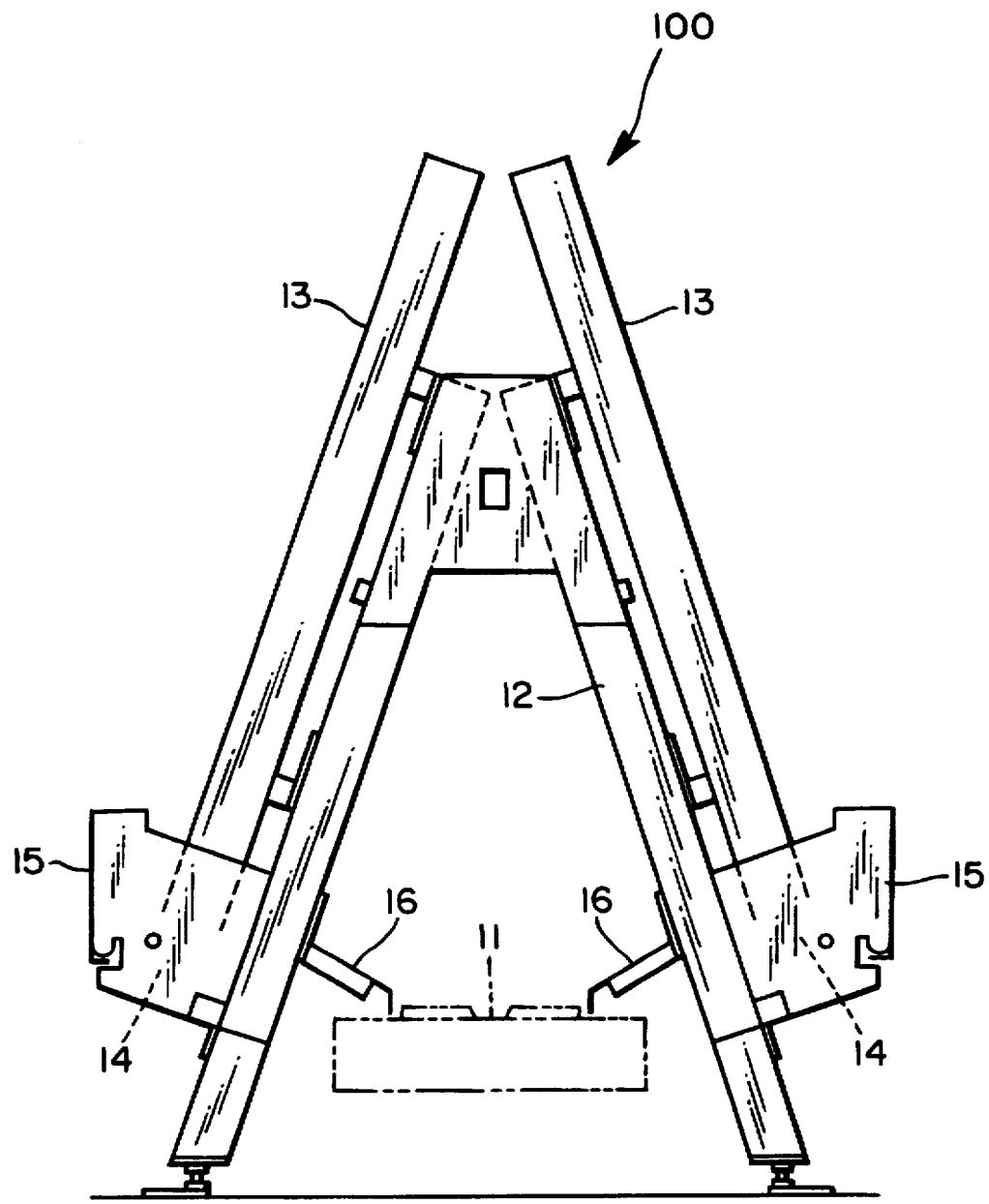
FIG. 5 is a front view of the object loading system of FIG. 4.

Referring to FIG. 5, chutes 16 direct discharged objects A to the center of object conveyor 11 of object loading system 100. Chutes 16 also ensure that objects A do not roll off of or are not pushed off of the sides of object conveyor 11.

Figure 6:
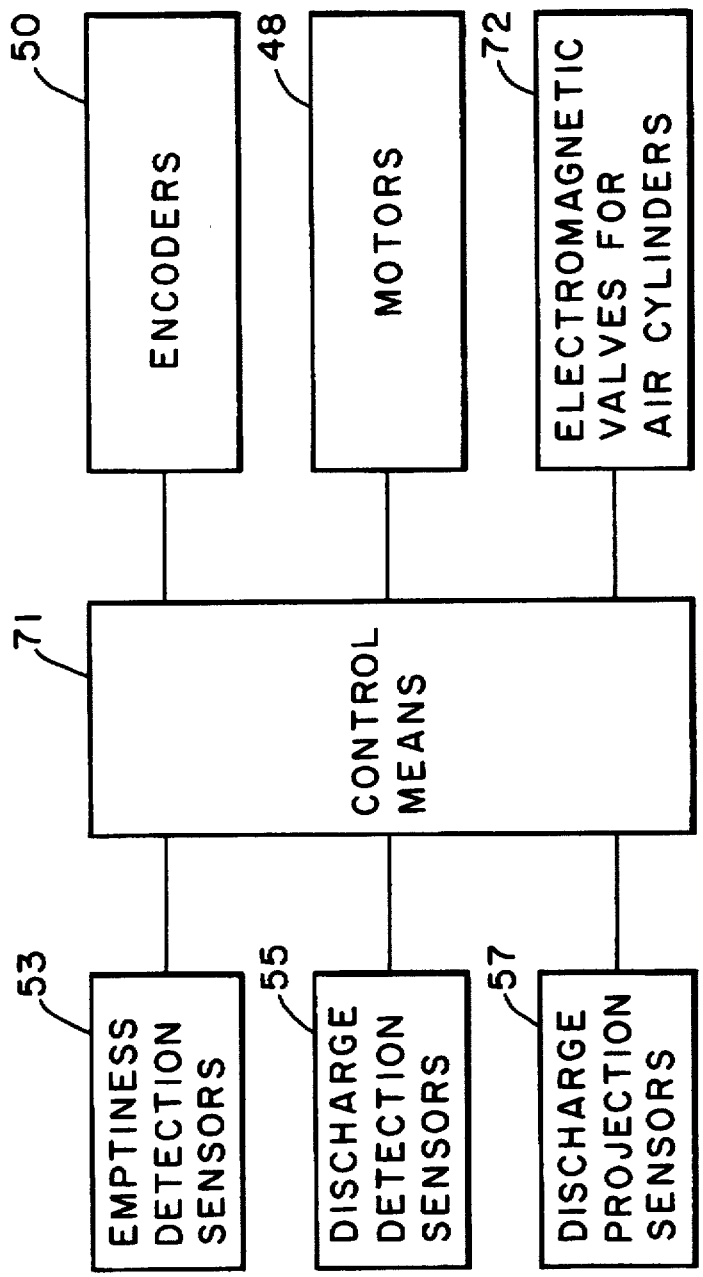
FIG. 6 is a block diagram of a control system of the object discharge device of FIG. 1.

Referring to FIG. 6, a controller 71 of object loading system 100 monitors an emptiness detection sensor 53, discharge detection sensor 55 and discharge projection sensor 57. An encoder 50 and motor 48 are also connected to controller 71. Encoder 50 detects the degree of rotation of motor 48. Controller 71 calculates the degree of rotational movement of timing belt 44 based on the output of encoder 50. Based on signals input from encoder 50, controller 71 determines a current degree of rotation of timing belt 44 and controls motor 48 to rotate timing belt 44 with respect to its standard position, i.e., the position when one of discharge projections 47 of timing belt 44 is in discharge port 28.

An electromagnetic valve 72 is also connected to controller 71. Electromagnetic valve 72 controls the direction of air flow for air cylinder 62. Controller 71 also controls the operation of electromagnetic valve 72 to move lifting member 66 forward or rearward with respect to the initial position of lifting member 66 (i.e. its retracted position).

Referring also to FIG. 3, an emptiness detection sensor 53, below cutout hole 51, detects the presence of an object when detection piece 52 is pushed below load receiving platform 32. Emptiness detection sensor 53 detects the lack of an object or emptiness of object storage section 13 when detection piece 52 projects above load receiving platform 32.

Figure 7A:
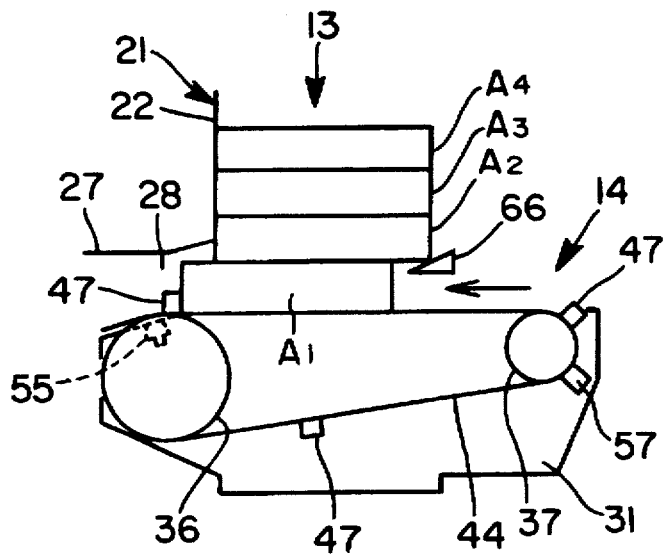
FIG. 7a shows the object discharge device of FIG. 1 at the beginning of a discharge cycle.

Referring to FIG. 7a, in the stand-by state ready to discharge, lifting member 66 is at its initial position, i.e., the retracted position. In this state, the bottommost object A from among a stack of a plurality of objects A contained in each object storage section 13 contacts load receiving platforms 32, bearing the weight of all other objects A stacked thereon. One of discharge projections 47 of timing belt 44 is at its standard position in the discharge port 28, thereby preventing bottommost object A from slipping out of discharge port 28.

To discharge a bottommost object $A_1$ from object storage/discharge unit 10, air cylinder 62 is actuated to advance lifting member 66 into object storage section 13. Lifting member 66 urges next bottommost object $A_2$ upward. Bottommost object $A_1$ is thus relieved of the weight of the remainder of objects A.

Figure 7B:
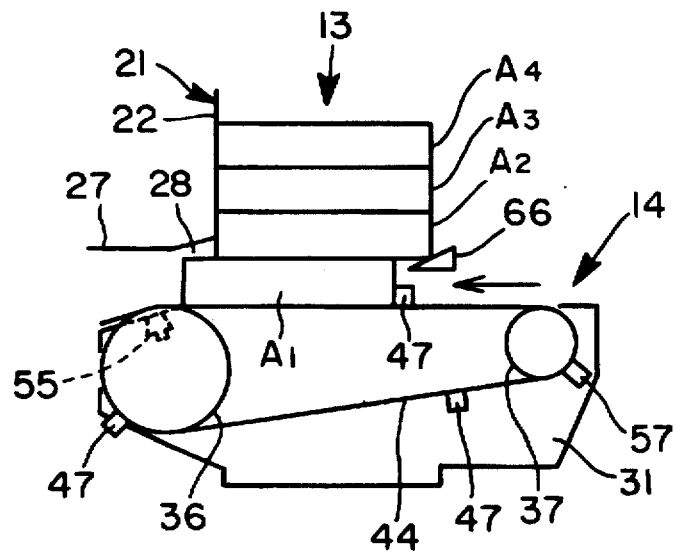
FIG. 7b shows the object discharge device of FIG. 7a beginning to move the bottommost object out of the object storage device.

Referring to FIG. 7b, motor 48 actuates to rotate timing belt 44. Discharge projection 47 located upstream from bottommost object A with respect to discharge direction F comes into contact with bottommost object $A_1$.

Figure 7C:
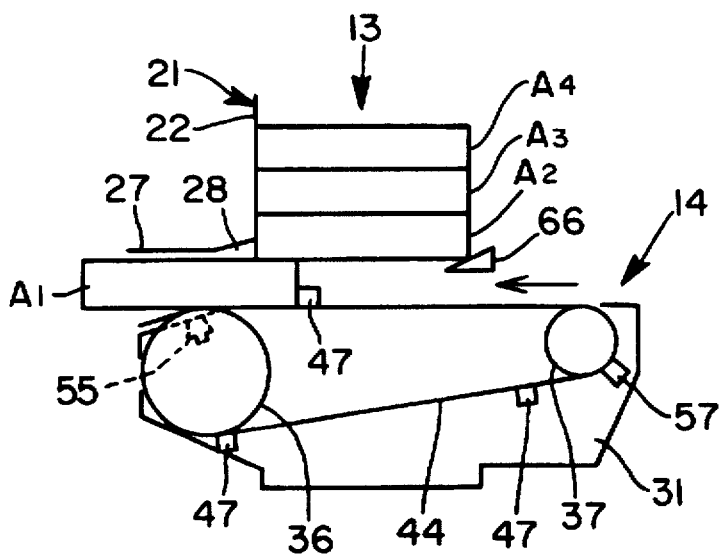
FIG. 7c shows the object discharge device of FIG. 7a when a discharge detection sensor detects the presence of the bottommost object.

Referring to FIG. 7c, discharge projection 47 pushes bottommost object $A_1$ towards discharge port 28. Discharge detection sensor 55 detects bottommost object $A_1$ being pushed towards discharge port 28.

Figure 7D:
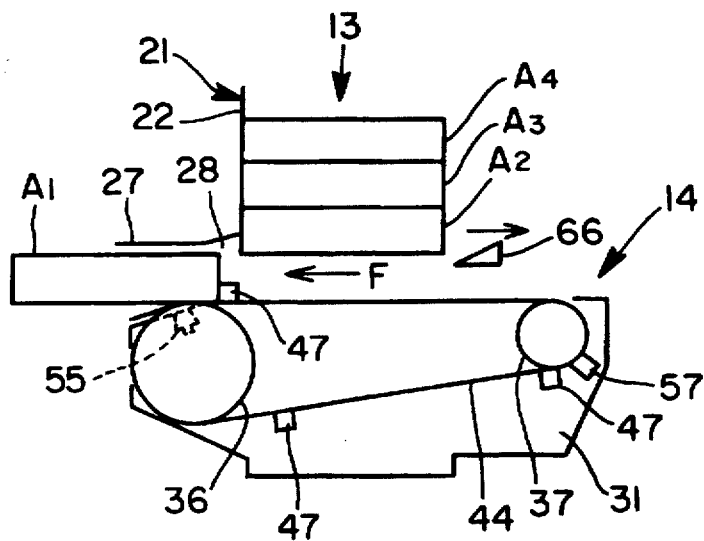
FIG. 7d shows the object discharge device of FIG. 7a with the bottommost object completely discharged and lifting member retracted.

Referring to FIG. 7d, when bottommost object $A_1$ is pushed out of the bottom of object storage section 13 with discharge projection 47 not yet reaching the standard position inside discharge port 28, air cylinder 62 actuates to retract lifting member 66. Next bottommost object $A_2$ lowers into the bottommost object $A_1$ position.

Figure 7E:
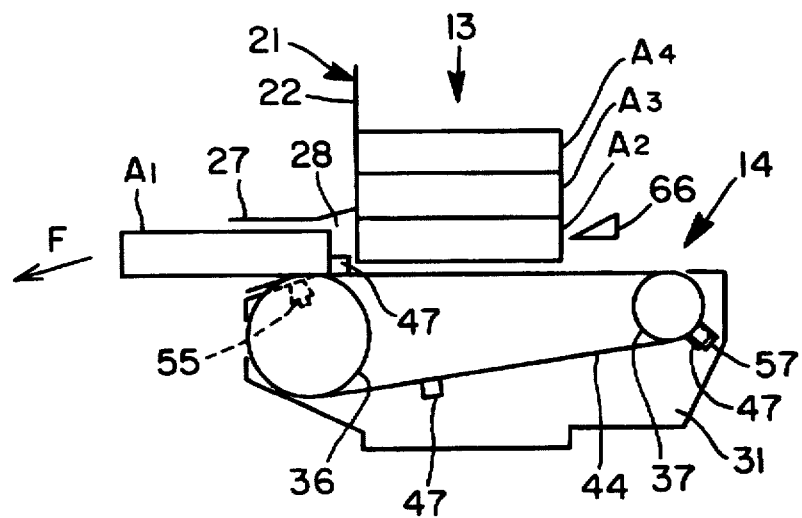
FIG. 7e shows the object discharge device of FIG. 7a when the objects remaining in the stack are lowered after discharge of the bottommost object.

Referring to FIG. 7e, when original bottommost object $A_1$ is pushed out of the bottom of object storage section 13, discharge projection 47 has almost reached the standard position. Discharge projection detection sensor 57 detects the passing of discharge projection 47 which conducts the subsequent discharge action.

When only a single object A is to be discharged, or when the last of a series of objects A is discharged, motor 48 halts so that discharge projection 47 stops at the standard position. The system is now back in the stand-by state waiting for the next cycle of object discharge.

Figure 7F:
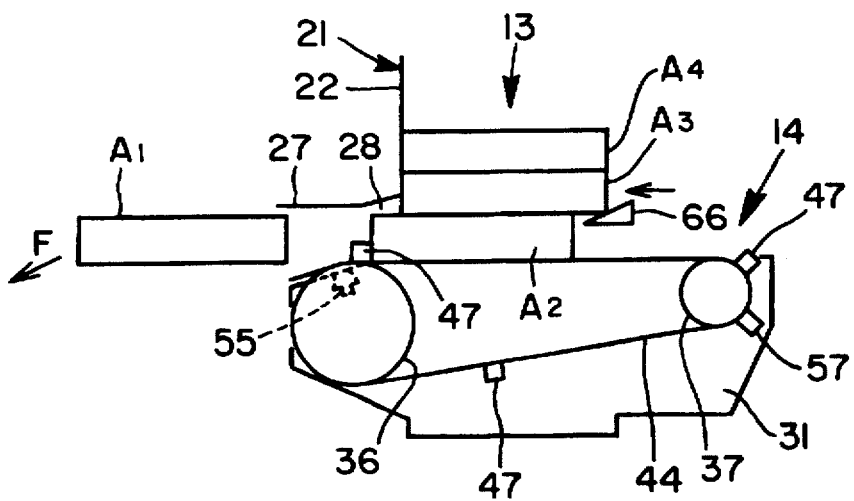
FIG. 7f shows the object discharge device of FIG. 7a at the beginning of a new discharge cycle with a new bottommost object.

Referring to FIG. 7f, when a plurality of objects A are successively discharged, air cylinder 62 is actuated to advance lifting member 66, thereby raising objects A positioned above bottommost object $A_1$. Bottommost object $A_1$, $A_2$, . . . are successively discharged following the same procedure described above, with motor 48 continuously running. After a desired number of objects A are discharged, motor 48 halts so that discharge projection 47, which has finished the discharging action, stops at the standard position inside discharge port 28. The system returns to the stand-by state waiting for the next cycle of object discharging.

By continuously turning timing belt 44 as described above, objects A are successively retrieved at a high speed. Furthermore, as discharge projection 47 which has finished the discharge action stops at the standard position inside discharge port 28, objects A are prevented from spilling out of discharge port 28 even though load receiving platforms 32 are inclined towards belt conveyor 11. Thus, erroneous retrieval of objects A is prevented.

When discharging an object, as lifting member 66 lifts objects A which are positioned above the bottommost object, bottommost object A is relieved of the weight of the other objects stacked thereon. Therefore, not only is bottommost object $A_1$ consistently discharged with a minimal ejection force, but also is protected from damage such as scrapes on the surface, peeling off of printing on the surface, and tearing of its wrapping.

When discharge projection detection sensor 57 fails to detect discharge projection 47 which conducts the subsequent discharging cycle, controller 71 regards it as an abnormal condition. Furthermore, where discharging detection sensor 55 does not detect object A or where the presence of object A continues to be detected, controller 71 determines that object A is stuck along the discharge route and alerts the operator.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An object discharge device effective for discharging a bottommost object from a stack of objects, comprising:

a bottom platform on which said bottommost object of said stack of objects rests;

a discharge port at an end of said bottom platform;

means for pushing said bottommost object across said bottom platform through said discharge port from a first position at a bottom of said stack to a second position at least partially outside said object discharge device;

an object lifter movably mounted at a lower rear portion of said object discharge device, at an end of said bottom platform opposite said discharge port;

said object lifter movable between a retracted position, whereat said object lifter does not contact any of said objects, and an advanced position whereat said object lifter supports a next bottommost object; and means for moving said object lifter between said retracted position and said advanced position.

2. The object discharge device of claim 1, wherein said means for pushing includes:

first and second pulleys;

a belt reeved about said first and second pulleys;

said first and second pulleys being mounted in said object discharge device such that an upper free-spanning portion of said belt is positioned in a longitudinal slot in said bottom platform;

at least one projection attached to an outer surface of said belt;

said at least one projection projecting above said bottom platform through said longitudinal slot when said at least one projection is on said upper free-spanning portion of said belt; and means for driving one of said first and second pulleys.

3. The object discharge device of claim 2, further including:

a controller; and said controller including means for controlling said means for driving said one of said first and second pulleys and said means for moving said object lifter.

4. The object discharge device of claim 3, wherein said controller further includes means for determining a position of said belt.

5. The object discharge device of claim 4, wherein said means for determining a position of said belt includes means for determining a degree of rotation of one of said first and second pulleys.

6. The object discharge device of claim 3, further including:

an object sensor including means for transmitting a first signal to said controller responsive to whether an object is in said discharge port; and said means for controlling being responsive to said means for transmitting said first signal.

7. The object discharge device of claim 6, further including:

a projection sensor mounted below said bottom plate;

said projection sensor including means for transmitting a second signal to said controller responsive to whether said at least one projection has passed said projection sensor; and said means for controlling being responsive to said means for transmitting said second signal.

8. The object discharge device of claim 3, further including:

a projection sensor mounted below said bottom plate;

said projection sensor including means for transmitting a second signal to said controller responsive to whether said at least one projection has passed said projection sensor; and said means for controlling being responsive to said means for transmitting said second signal.

9. The object discharge device of claim 3, further including:
- an emptiness sensor mounted above said bottom plate;
- said emptiness sensor including means for transmitting an empty signal to said controller responsive to whether said stack of objects contains less than a predetermined amount of objects; and
- said means for controlling being responsive to said empty signal.

10. The object discharge device of claim 1, wherein said object lifter includes an inclined surface, said inclined surface supporting said next bottommost object when said object lifter is in said advanced position.

11. The object discharge device of claim 1, further including:
- a controller; and
- said controller including means for controlling said means for pushing said bottommost object and said means for moving said object lifter.

12. The object discharge device of claim 11, further including:
- an emptiness sensor mounted above said bottom plate;
- said emptiness sensor including means for transmitting an empty signal to said controller responsive to an absence of objects in said discharge device; and
- said means for controlling being responsive to said empty signal.

13. An object loading device effective for storing a plurality of stacks of objects and discharging a bottommost object of each of said plurality of stacks of objects onto an object conveyor, comprising a plurality of object discharge devices, each of said plurality of object discharge devices further including:
- a bottom platform on which said bottommost object of said each of said plurality of stacks of objects rests;
- said bottom platform having a longitudinal slot;
- a discharge port at an end of said bottom platform;
- means for pushing said one of said bottommost objects along said bottom platform through said discharge port from a first position at a bottom of said one of said stacks to a second position at least partially outside said one of said object discharge device;
- an object lifter movably mounted at a lower rear portion of said each one of said plurality of object discharge devices on an opposite end of said bottom platform from said discharge port;
- said object lifter movable between a retracted position, whereat said object lifter does not contact any of said objects, and an advanced position whereat said object lifter supports a next bottommost object of said each of said plurality of stacks of objects; and
- means for moving said object lifter between said retracted position and said advanced position.

14. The object loading device of claim 13, wherein said means for pushing includes:
- first and second pulleys;
- a belt reeved about said first and second pulleys;
- said pulleys being mounted in said each one of said plurality of object discharge devices such that an upper free-spanning portion of said belt is positioned in a longitudinal slot in said bottom platform;
- said belt having a plurality of periodically positioned projections attached to an outer surface thereof;
- said plurality of projections projecting above said bottom platform through said longitudinal slot when said plurality of projections are on said upper free-spanning portion of said belt; and
- means for driving one of said first and second pulleys.

15. The object discharge device of claim 14, wherein said controller further includes means for determining a position of said belt.

16. The object loading device of claim 14, further including:
- a controller; and
- said controller including means for controlling said means for driving said one of said first and second pulleys and said means for moving said object lifter for said each one of said plurality of object storage and discharge devices.

17. The object loading device of claim 16, wherein each one of said plurality of object discharge devices further includes:
- an object sensor including means for transmitting a first signal to said controller responsive to whether an object is in said discharge port; and
- said means for controlling being responsive to said means for transmitting said first signal for said each one of said plurality of object discharge devices.

18. The object loading device of claim 17, wherein each one of said plurality of object discharge devices further includes:
- a projection sensor mounted below said bottom plate;
- said projection sensor including means for transmitting a second signal to said controller responsive to whether one of said plurality of projections has passed said projection sensor; and
- said means for controlling being responsive to said means for transmitting said second signal for said each one of said plurality of object storage and discharge devices.

19. The object loading device of claim 16, wherein each one of said plurality of object discharge devices further includes:
- a projection sensor mounted below said bottom plate;
- said projection sensor including means for transmitting a second signal to said controller responsive to whether one of said plurality of projections has passed said projection sensor; and
- said means for controlling being responsive to said means for transmitting said second signal.

20. The object loading device of claim 16, wherein each one of said plurality of object discharge devices further includes:
- an emptiness sensor mounted above said bottom plate;
- said emptiness sensor including means for transmitting an empty signal to said controller responsive to whether said stack of objects contains less than a predetermined amount of objects; and
- said means for controlling being responsive to said empty signal.

21. The object discharge device of claim 15, wherein said means for determining a position of said belt includes means for determining a degree of rotation of a one of said first and second pulleys.

22. The object loading device of claim 13, further including:
- a controller; and
- said controller including means for controlling said means for pushing and said means for moving said object lifter for each of said plurality of object storage and discharge devices.

23. The object loading device of claim 22, wherein each one of said object discharge devices further includes:

an emptiness sensor mounted above said bottom plate;

said emptiness sensor including means for transmitting an empty signal to said controller responsive to an absence of objects in each one of said plurality of object discharge devices; and said means for controlling being responsive to said empty signal for said each one of said plurality of object discharge devices.

24. An object loading device for storing a plurality of stack of objects and discharging a bottommost object of each of said plurality of stack of objects onto an object conveyer, comprising a plurality of object discharge devices, each of said plurality of object discharge devices further including:

a bottom platform on which said bottommost object of said each of said plurality of stacks of objects rests;

said bottom platform having a longitudinal slot;

a discharge port at an end of said bottom platform;

means for pushing said on of said bottommost objects along said bottom platform through said discharge port from a first position at a bottom of said one of said stacks to a second position at least partially outside said one of said object discharge devices;

an object lifter movably mounted at a lower rear portion of said each one of said plurality of object discharge devices on an opposite end of said bottom platform from said discharge port;

said object lifter includes an inclined surface, said inclined surface supporting said next bottommost object when said object lifter is in said raised position;

said object lifter movable between a retracted position, whereat said object lifter does not contact any of said objects, and a raised position whereat said object lifter supports a next bottommost object of said each of said plurality of stacks of objects: and means for moving said object lifter between said retracted position and said advanced position.

* * * * *